US009317621B2

(12) United States Patent
French et al.

(10) Patent No.: US 9,317,621 B2
(45) Date of Patent: Apr. 19, 2016

(54) PROVIDING DEEP LINKS IN ASSOCIATION WITH TOOLBARS

(75) Inventors: Charles Hastings French, Seattle, WA (US); Nathan Deepak Jhaveri, Bellevue, WA (US); Ambarish Chitnis, Redmond, WA (US); Shovon Nazmus, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 12/985,941

(22) Filed: Jan. 6, 2011

(65) Prior Publication Data

US 2012/0179955 A1 Jul. 12, 2012

(51) Int. Cl.
*G06F 17/00* (2006.01)
*G06F 17/30* (2006.01)

(52) U.S. Cl.
CPC .............................. *G06F 17/30899* (2013.01)

(58) Field of Classification Search
CPC ............................................... G06F 17/30884
USPC .......................... 715/206, 207, 208, 205, 825
See application file for complete search history.

(56) References Cited

U.S. PATENT DOCUMENTS

| 6,539,424 | B1 * | 3/2003 | Dutta ............................. 709/219 |
| 6,925,496 | B1 | 8/2005 | Ingram et al. |
| 7,873,537 | B2 * | 1/2011 | McQueeney et al. ...... 705/14.49 |
| 2005/0060655 | A1 | 3/2005 | Gray et al. |
| 2005/0125285 | A1 | 6/2005 | McQueeney et al. |
| 2005/0216824 | A1 | 9/2005 | Ferguson et al. |
| 2006/0288000 | A1 | 12/2006 | Gupta |
| 2007/0094267 | A1 * | 4/2007 | Good et al. ...................... 707/10 |
| 2007/0198741 | A1 * | 8/2007 | Duffy et al. .................... 709/245 |
| 2008/0115047 | A1 | 5/2008 | Petri |
| 2008/0168039 | A1 | 7/2008 | Carpenter et al. |
| 2011/0231897 | A1 * | 9/2011 | Tovar ............................... 726/1 |
| 2013/0339381 | A1 | 12/2013 | Pfleger |

FOREIGN PATENT DOCUMENTS

| CN | 101027667 A | 8/2007 |
| CN | 101122907 A | 2/2008 |

(Continued)

OTHER PUBLICATIONS

Pandia 'Search and Social,' Google and Yahoo, 'Improvied Web Search', Posted Sep. 27, 2009. http://www.pandia.com/sew/2099-google-and-yahoo-improve-web-search.html.*

(Continued)

*Primary Examiner* — Stephen Hong
*Assistant Examiner* — Matthew Ludwig
(74) *Attorney, Agent, or Firm* — Dave Ream; Jim Ross; Micky Minhas

(57) ABSTRACT

Computer-readable media, computer systems, computing methods, and computing devices for providing deep-link notifications is provided. In embodiments, the method includes identifying one or more deep links that correspond with a navigated to website. Such deep links may be identified using a search service. The deep links can be comprised of popular links within the website other than a main page of the website. Upon identifying deep links that correspond with a navigated to website, a deep-link notification is provided via a toolbar. The deep-link notification provides an indication that deep links are available for the website.

15 Claims, 6 Drawing Sheets

(56) References Cited

FOREIGN PATENT DOCUMENTS

| CN | 101178722 A | 5/2008 |
|---|---|---|
| CN | 101203856 A | 6/2008 |
| WO | 2007096603 A2 | 8/2007 |

OTHER PUBLICATIONS

Scherotter, "How IE8 Enables Silverlight Deep Linking and Browser Back/Forward Navigation,"—Published Date: Jul. 10, 2008 http://blogs.msdn.com/b/synergist/archive/2008/07/10/how-ie8-will-enables-silverlight-deep-linking-and-browser-back-forward-navigation.aspx, 3 pp.

Wheeler, "Deep linking into Silverlight applications,"—Published Date: Feb. 28, 2009 http://www.vsj.co.uk/articles/display.asp?id=790, 10 pp.

"How to Get Deep Links with RSS Feeds,"—Retrieved Date: Sep. 17, 2010 http://www.squidoo.com/deep-links-with-rss-feeds, 15 pp.

Berkovitz, "Flex 3 Details—Deep Linking," Adobe Bug and Issue Management System, Retrieved Date: Sep. 17, 2010, http://bugs.adobe.com/confluence/display/ADOBE/Flex+3+Details++-+Deep+Linking, 7 pp.

"Deep linking,"—Retrieved Date: Sep. 17, 2010 http://en.wikipedia.org/wiki/Deep_linking, 4 pp.

PCT International Search Report, mailed Aug. 30, 2012, 12 pp.

Chinese Office Action dated Aug. 8, 2014 with Search Report dated Jul. 31, 2014 in Application No. 2012100028008, 5pages.

"First Office Action and Search Report Received in China Patent Application No. 201210002800.8", Mailed Date: Jan. 6, 2014, 8 Pages.

"Third Office Action Received in China Patent Application No. 201210002800.8", Mailed Date: Feb. 13, 2015, 7 Pages.

\* cited by examiner

PROVIDING DEEP LINKS IN ASSOCIATION WITH TOOLBARS

BACKGROUND

Navigation models associated with many websites may be confusing to users attempting to navigate the websites. In this regard, a user visiting a website for a first time, a user that has not recently visited a website, or a user visiting a website that has a revised navigation model may have difficulty navigating to particular portions of the website. By way of example only, navigation links used to navigate to specific portions of websites may be listed at various locations within websites (e.g., on the left portion of the webpage, across the top portion of the webpage, scattered throughout the webpage, etc.) or may be listed in various orders (e.g., an alphabetical order, a popularity order, a seemingly random order, etc.). Because of such inconsistencies in link positions and/or orders, it is oftentimes difficult for a user to find a particular link to navigate to another portion of the website. Accordingly, users may spend an unnecessary amount of time finding a specific link. This results in a poor user experience, longer task-completion time, and less successful navigation within a website.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

According to embodiments of the invention, deep links that point to a specific item within a website other than a main page of the website are provided via a toolbar. Upon a user navigating to a network document (e.g., a website or webpage), a domain associated with the document is identified. Such a domain can be utilized to identify one or more deep links that correspond with the navigated to document. For example, to identify a deep link(s), a search service can be queried using the domain (or a variation thereof) as a query to obtain a relevant search result(s) and/or a deep link(s) associated with the domain representing the document. In accordance with identifying deep links, a deep-link notification can be presented to provide an indication that deep links corresponding with the navigated to document exist or are available. In this regard, a deep-link notification including the deep links can be displayed to a user via a toolbar within a web browser. Accordingly, a user can navigate a website using deep links provided in association with a toolbar.

BRIEF DESCRIPTION OF THE DRAWINGS

Embodiments of the invention are described in detail below with reference to the attached drawing figures, wherein.

DETAILED DESCRIPTION

Figure 1:
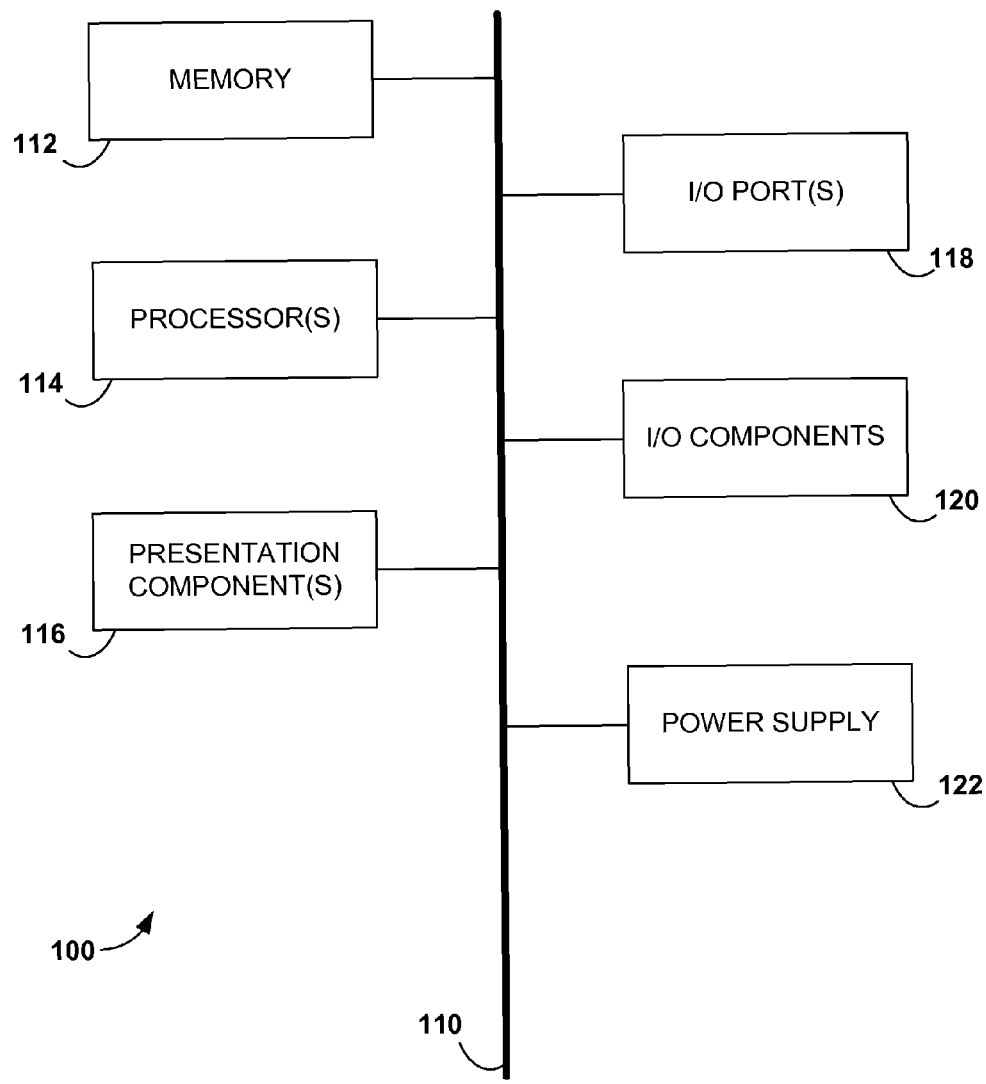
FIG. 1 is a block diagram of an exemplary computing device suitable for implementing embodiments of the invention.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention described herein include computer-readable media having computer-executable instructions for performing a method of providing deep-link notifications. The method includes identifying deep links that correspond with a navigated to website. Each of the deep links comprises a link that points to a specific item within the website other than a main page of the website. In embodiments, a deep link is a popular link or commonly clicked or selected link on a particular webpage. A deep-link notification can be provided via a toolbar. The deep-link notification provides an indication that the one or more deep links are available for the website.

In a second illustrative embodiment, a graphical user interface embodied on one or more computer-readable media and executable on a computer is provided. The graphical user interface includes a first display area configured for displaying a web document. The graphical user interface also includes a second display area positioned near the first display area. The second display area includes a toolbar that displays a deep-link notification indicating one or more deep links are available, via the toolbar, for use in navigating the web document displayed in the first display area, each of the one or more deep links comprising a link that points to a specific item within the web document other than a main page of the web document.

In a third illustrative embodiment a method of providing deep-link notifications is provided. The method includes identifying a domain associated with a navigated to website and determining that the domain is included within a domain white list that specifies a set of one or more domains for which deep links should be identified. A search request is presented to a search service to request search results (e.g., including deep links) that correspond with the domain. A search result(s) that corresponds with the domain is received. The search result(s) is used to identify deep links associated with the website. A deep-link notification is presented that indicates at least one deep link is available for use in navigating the website.

Various aspects of embodiments of the invention may be described in the general context of computer program products that include computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplate media readable by a database, a processor, and various other networked computing devices. By way of example, and not limitation, computer-readable storage media include media implemented in any method or technology for storing information. Examples of stored information include computer-executable instructions, data structures, program modules, and other data representations. Computer-readable storage media examples include RAM, ROM, EEPROM, flash memory and other memory technology, CD-ROM, digital versatile discs (DVD), holographic media and other optical disc storage, magnetic cassettes, magnetic tape, magnetic disk storage, and other magnetic storage devices. These technologies can store data momentarily, temporarily, or permanently. Computer-readable storage media may be tangible or non-transitory.

An exemplary operating environment in which various aspects of the present invention may be implemented is described below in order to provide a general context for various aspects of the present invention. Referring initially to FIG. 1, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The computing device 100 includes a bus 110 that directly or indirectly couples the following devices: a memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The memory 112 includes computer-executable instructions (not shown) stored in volatile and/or nonvolatile memory. The memory may be removable, nonremovable, or a combination thereof. Exemplary hardware devices include solid-state memory, hard drives, optical-disc drives, etc. The computing device 100 includes one or more processors 114 coupled with a system bus 110 that read data from various entities such as the memory 112 or I/O components 120. In an embodiment, the one or more processors 114 execute the computer-executable instructions to perform various tasks and methods defined by the computer-executable instructions. The presentation component(s) 116 are coupled to the system bus 110 and present data indications to a user or other device. Exemplary presentation components 116 include a display device, speaker, printing component, and the like.

The I/O ports 118 allow computing device 100 to be logically coupled to other devices including the I/O components 120, some of which may be built in. Illustrative components include a microphone, joystick, game pad, satellite dish, scanner, printer, wireless device, keyboard, pen, voice input device, touch-input device, touch-screen device, interactive display device, or a mouse. The I/O components 120 can also include communication connections that can facilitate communicatively connecting the computing device 100 to remote devices such as, for example, other computing devices, servers, routers, and the like.

Figure 2:
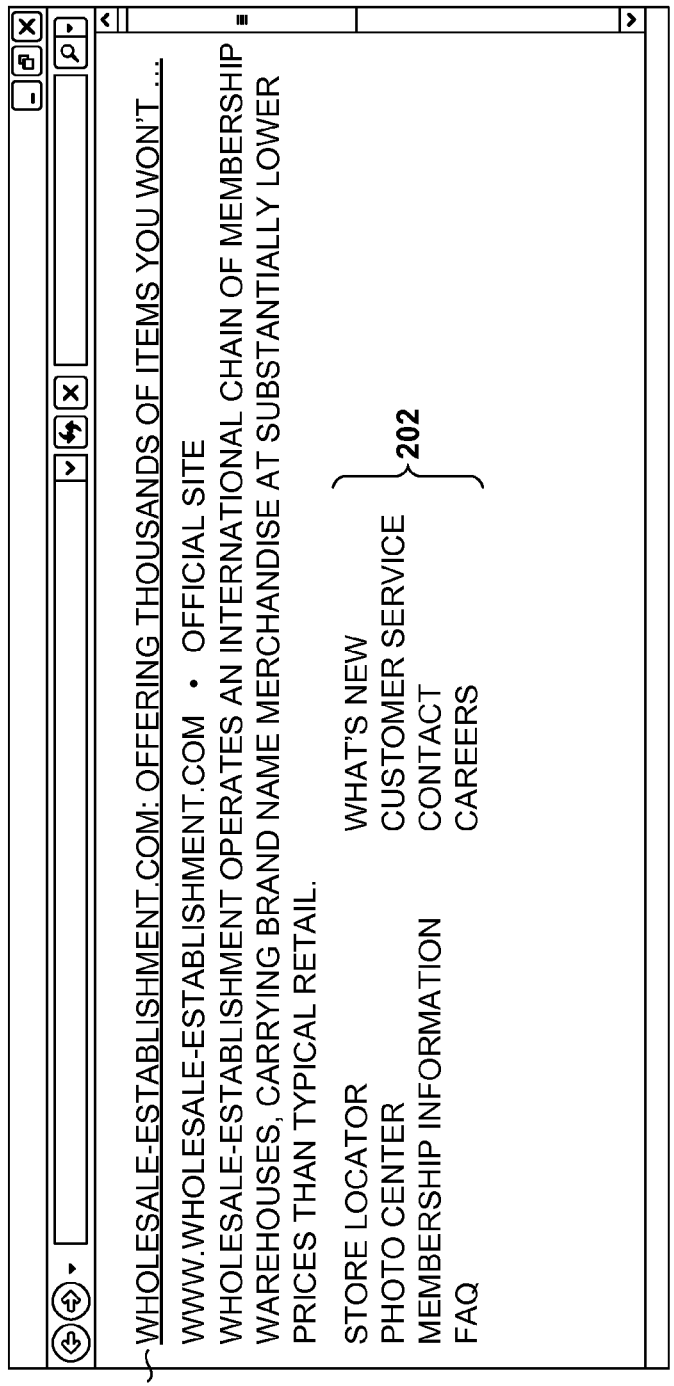
FIG. 2 is a schematic diagram depicting an illustrative display of a search result item and corresponding deep links.

Embodiments of the present invention are directed to providing deep links, for example, in association with a toolbar such that a user has access to deep links while navigating within a website. Deep links have been traditionally provided in association with a search results page. As illustrated in FIG. 2, in response to a user query, a set of one or more deep links 202 can be displayed in association with a search result 204 within a search results page 200. Such deep links 202 enable a user to directly navigate to a specific item (e.g., a webpage or an image) within the website corresponding with the search result. Upon navigating to a website, however, a user currently does not have access to such deep links provided in association with a search service.

In accordance with embodiments of the present invention, deep links, or a notification thereof, are provided in association with a toolbar such that a user has access to deep links corresponding with a website currently being navigated. Accordingly, embodiments of the present invention facilitate providing deep links in connection with a toolbar to enable a user to navigate within a website using such deep links. A deep link refers to a link, such as a hyperlink, that points to a specific page or image within a website other than the website's main or home page. In this way, a uniform resource locator (URL) of a deep link contains all the information needed to point to a particular item.

As used herein, a deep link includes a representation of a link that points to a specific page or image within a website other than the website's main or home page. Accordingly, deep links can be presented, for example, as text, snippets, thumbnails, summaries, answers, and the like. In this regard, a deep link includes a selectable representation of a link that corresponds with a uniform resource locator (URL), IP address, or other type of location or address. As such, selection of a deep link can result in redirection of the user's browser to the corresponding address, whereby the user can access the associated content.

As previously mentioned, according to embodiments of the present invention, deep links can be displayed to a user via a toolbar. A toolbar(s) may be provided in a web browser window and may include, for example, tabs for aiding a user in navigating the Web and in organizing display space. A toolbar may additionally or alternatively include one or more shortcut buttons that provide ease of access to commonly used functions and/or one or more of a multitude of web browser add-on components that are available in the art. In one embodiment, a toolbar is a search toolbar that provides a search interface. For instance, a search toolbar may reside near a web browser tab bar and provide a search box to carry out web searches.

Figure 3:
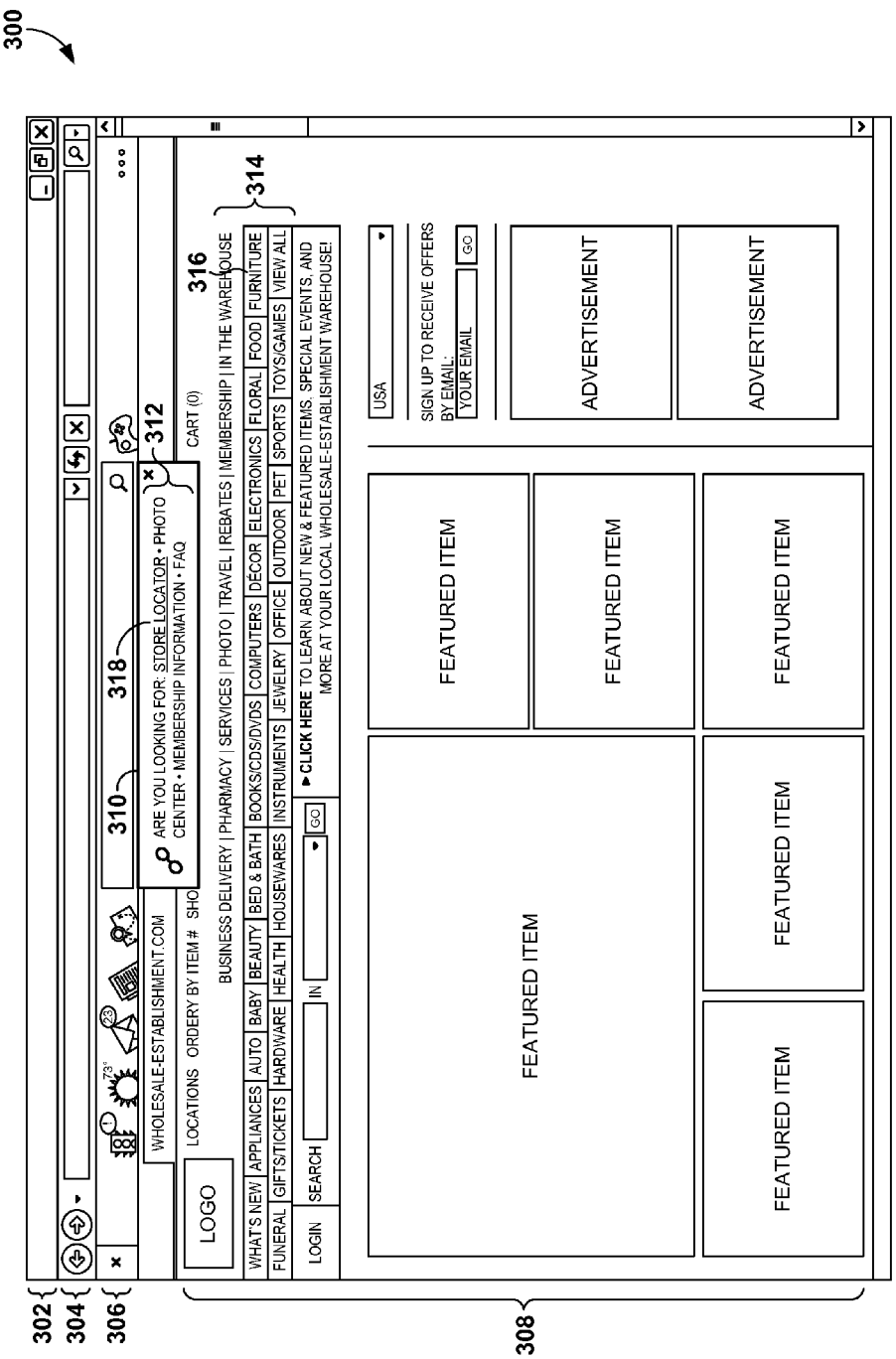
FIG. 3 provides an exemplary illustration of a deep-link notification, in accordance with embodiments of the invention.

By way of example only, FIG. 3 provides a view of a web browser 300 having a traditional set of links 314 to various portions of the website. For instance, the "Furniture" link 316 within the display pane 308, if selected, results in navigation to furniture items that can be purchased via the website. A toolbar 306 is displayed above the display pane 308. The toolbar 306 includes a deep-link notification 310 that provides a notification that deep links are available to a user to utilize to navigate within the website displayed within the display pane 308. Accordingly, a user can select a deep link, such as "store locator" deep link 318, within the deep-link notification 310 to navigate directly to the specific webpage corresponding with the deep link.

Figure 4:
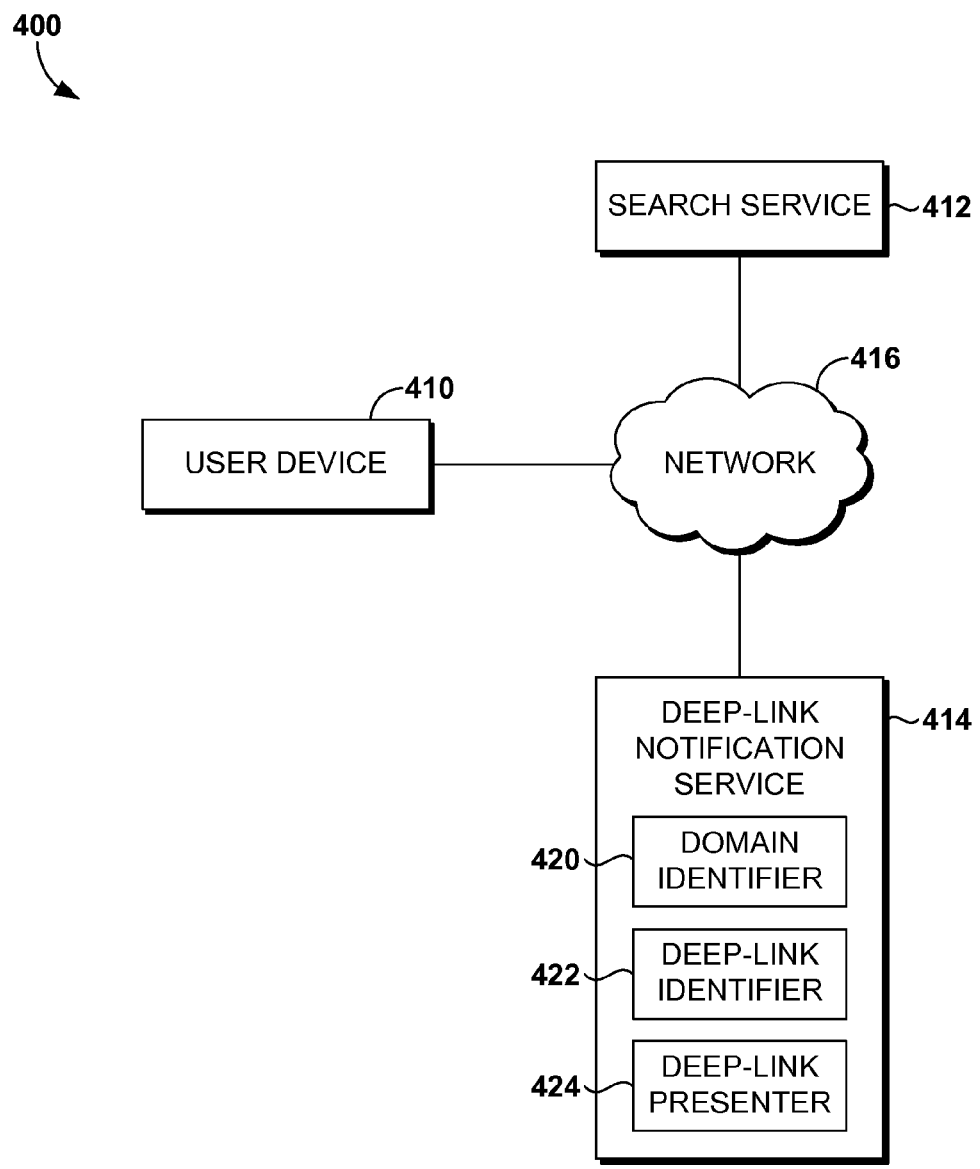
FIG. 4 is a block diagram of an exemplary network environment suitable for use in implementing embodiments of the invention.

Turning now to FIG. 4, a block diagram of an exemplary network environment 400 suitable for use in implementing embodiments of the invention is shown. The network environment 400 includes a user device 410, a search service 412, and a deep-link notification service 414. The user device 410, the search service 412, and the deep-link notification service 414 may communicate through a network 416, which may include any number of networks such as, for example, a local area network (LAN), a wide area network (WAN), the Internet, a cellular network, a peer-to-peer (P2P) network, a mobile network, or a combination of networks. The network environment 400 shown in FIG. 4 is an example of one suitable network environment and is not intended to suggest any limitation as to the scope of use or functionality of embodiments of the inventions disclosed throughout this document. Neither should the exemplary network environment 400 be interpreted as having any dependency or requirement related to any single component or combination of components illustrated therein. For example, the user device 410 may be in communication with the search service 412 via a mobile network or the Internet, and the search service 412 may be in communication with the deep-link notification service 414 via a local area network. Further, although the environment 400 is illustrated with a network, one or more of the components may directly communicate with one another, for example, via HDMI (high-definition multimedia interface), DVI (digital visual interface), etc. Alternatively, one or more of the components may be integrated with one another, for example, at least a portion of the deep-link notification service 414 may be integrated with the user device 410, or a portion thereof (e.g., a web browser).

The user device 410 can be any kind of computing device capable of allowing a user to navigate websites. For example, in an embodiment, the user device 410 can be a computing device such as computing device 100, as described above with reference to FIG. 1. In embodiments, the user device 410 can be a personal computer (PC), a laptop computer, a workstation, a mobile computing device, a PDA, a cell phone, or the like.

In an embodiment, the user device 410 is separate and distinct from the search service 412 and/or the deep-link notification service 414 illustrated in FIG. 4. In another embodiment, the user device 410 is integrated with the search service 412 and/or the deep-link notification service 414, or a portion thereof. For example, at least a portion of the deep-link notification service 414 may reside on the user device 410. For clarity of explanation, we shall describe embodiments in which the user device 410, the search service 412, and the deep-link notification service 414 are separate, while understanding that this may not be the case in various configurations contemplated within the present invention.

With continued reference to FIG. 4, the user device 410 communicates with the search service 412 to facilitate a search for content. In embodiments, for example, a user utilizes the user device 410 to search for content available via the network 416. For instance, in some embodiments, the network 416 might be the Internet, and the user device 410 interacts with the search service 412 to search for content stored on servers associated with websites. In other embodiments, for example, the network 416 might be an enterprise network associated with a company. In these embodiments, the user device 410 interacts with the search service 412 to search for content stored on various nodes within the enterprise network. It should be apparent to those having skill in the relevant arts that any number of other implementation scenarios may be possible as well.

The search service 412 provides searching services. In embodiments, the search service 412 provides searching services by searching for content in an environment in which content can be stored such as, for example, the Internet, a local area network (LAN), a wide area network (WAN), a database, a computer, or the like. The search service 412, according to embodiments, can be implemented as server systems, program modules, virtual machines, components of a server or servers, networks, and the like.

In embodiments, the search service 412 receives search queries, i.e., search requests, submitted by a user via the user device 410 and/or submitted by the deep-link notification service 414. Search queries received from a user can include search queries that were manually or verbally input by the user, queries that were suggested to the user and selected by the user, and any other search queries received by the search service 412 that were somehow approved by the user. Additionally or alternatively, the search service 412 can receive search queries originating from the deep-link notification service 414, or a portion thereof. For instance, the deep-link notification service 414 can provide search queries or requests in response to user navigation to a website, as discussed more fully below. Generally, the search service 412 can receive search queries from any number of people, locations, organizations, and devices.

The search service 412 may be or include, for example, a search engine, a crawler, or the like. The search service 412, in some embodiments, is configured to perform a search using a query submitted through the user device 410 and/or a query submitted via the deep-link notification service 414. In an embodiment, the search service 412 is configured to receive a submitted query (e.g., via the user device 410 and/or the deep-link notification service 414) and to use the query to perform a search. In an embodiment, upon identifying search results and/or deep links that satisfy the search query, the search service 412 returns a set of one or more search results and/or deep links to the user device 410 and/or the deep-link notification service 414. Such search results and/or corresponding deep links may be displayed by way of a graphical interface. For example, deep links may be displayed via a deep-link notification presented in connection with a toolbar.

As can be appreciated, the search service 412 may communicate with the deep-link notification service 414 to integrate deep links in association with a toolbar. In this regard, the search service 412 may communicate deep links to deep-link notification service 414 for incorporation of the deep links in connection with a toolbar. In yet another embodiment, another component, such as the user device 410, may receive data from the search service 412 and/or the deep-link notification service 414 and, thereafter, integrate deep links in association with a toolbar.

The deep-link notification service 414 generally provides one or more deep links, or a notification thereof, to be displayed, for example, in association with a toolbar. The deep-link notification service 414, in some embodiments, includes a domain identifier 420, a deep-link identifier 422, and a deep-link presenter 424. According to embodiments of the invention, the deep-link notification service 414 can include any number of other components not illustrated. In some embodiments, one or more of the illustrated components 420, 422, and 424 can be integrated into a single component or can be divided into a number of different components. Components 420, 422, and 424 can be implemented on any number of machines and can be integrated, as desired, with any number of other functionalities or services. In embodiments, one or more of the illustrated components 420, 422, and 424 may be integrated into the operating system of a user device and/or a server in communication therewith or integrated with a web browser, or a toolbar associated therewith, of a user device. For example, the deep-link notification service 414 may be a toolbar tool that functions as add-on software to an existing web browser software.

The domain identifier 420 is configured to identify domains associated with documents (e.g., websites or webpages) being navigated to by a user. As used herein, a domain refers to a host name that identifies an internet protocol (IP) resource, such as webpage, a website, or the like. In this regard, a domain refers to, for example, at least a portion of a uniform resource locator (URL). Accordingly, the domain identifier 420 monitors and identifies domains (e.g., URLs) navigated to by a user. As can be appreciated, the domain identifier 420 can monitor and/or identify domains associated with navigated to websites utilizing any navigational manner, such as via a link or via input into the address bar. For example, in connection with a user entering a URL into an address bar or selecting a link to navigate to a particular website or webpage (e.g., via a search results page), the domain identifier 420 monitors and identifies the corresponding domain.

Although the domain identifier 420 is described herein as identifying domains corresponding with websites, webpages, or documents being navigated to by a user, any identifier that uniquely identifies websites, webpages, or documents being navigated to can be identified and utilized in accordance with embodiments of the present invention. For example, an IP address, a string designated to match a URL, or the like may additionally or alternative be identified and, thereafter, used to identify one or more deep links corresponding with the identifier.

The deep-link identifier 422 is configured to identify one or more deep links corresponding with navigated to documents (e.g., websites or webpages) or domains in association therewith. In this regard, the deep-link identifier 422 can utilize domains associated with navigated to documents to dynamically identify deep links. Upon identifying a document being navigated to by a user or a domain in association therewith, the deep-link identifier 422 can dynamically identify one or more deep links associated with such a document and/or domain.

The deep-link identifier 422 may utilize the search service 412 to identify one or more deep links that correspond with a particular document (e.g., a website or webpage). In one embodiment, a query or request may be issued (e.g., via an API) to the search service 412 to identify deep links that correspond with the specific document navigated to by the user or domain associated therewith. Such a query may be based on the identified domain (e.g., identified by the domain identifier) that corresponds with the navigated to document.

By way of example only, assume that a user navigates to example.com. In accordance with such a navigation, the deep-link identifier 422, or another component, may provide a request to the search service 412 for search results and/or deep links corresponding with the query "example" or "example.com." In this way, the search service 412 can perform a search based on the query "example" and provide search results, or a portion thereof (e.g., a portion of search results or deep links), corresponding with the query "example." As can be appreciated, in some cases, the search service 412 returns all available search results. In other cases, the search service 412 returns a portion of available search results, such as, the highest ranked search result. In yet other cases, the search service 412 might return deep links associated with a particular search result(s). By way of example only, the search service 412 may only return the top search result or deep links associated with the top search result based a request from the deep-link notification service 414 for such a result. In another example, the search service 412 may be configured, via a default setting, to return a particular set of results (e.g., a predefined number, etc.).

The data returned by the search service (e.g., all search results, a portion of the search results, deep links, etc.) can be analyzed to determine whether any deep links exist for the navigated to document or domain associated therewith. By way of example only, assume that a search service returns all search results or multiple search results for a particular query. In cases that deep links are provided for the top search result, any search result that is not the top ranked search result can be ignored while the top search result is analyzed to identify whether any deep links exist in association with that search result. The deep-link identifier 422 may analyze or verify that the search result corresponds with the document or domain. For instance, assume that multiple search results are returned. The deep-link identifier 422 may determine, recognize or verify which of the search results corresponds with the appropriate domain or navigated to document.

In addition to or in the alternative to utilizing the search service 412 to identify one or more deep links corresponding with a navigated to document or associated domain, in some embodiments, the deep-link identifier 422 may determine such deep links. For example, navigation logs, such as a toolbar log, may be analyzed to determine deep links for a particular document. A navigation log may monitor URLs visited by users and store such URLs, for example, within a database. The navigation log may be analyzed to determine popular or frequently visited webpage destinations within a website. The URL(s) associated with such popular or frequently visited webpage destinations within a website may be designated as a deep link for that particular website. As can be appreciated, irrespective of whether search services are utilized, deep links may change over time depending on popularity or importance of specific webpages within a website.

An identification of one or more deep links may be performed for each domain navigated to by a user. For example, in one embodiment, upon a user navigating to or passing a website or a webpage, a query can be issued to the search service 412 to identify deep links associated with the website or webpage. In another embodiment, upon a user navigating to or passing a web document, deep links associated with the website or webpage can be identified, for instance, using navigation logs.

Alternatively, an identification of one or more deep links may be performed for a portion of documents navigated to by a user. For example, deep links may be identified in cases that the user views a webpage for a particular amount of time, the user has not recently viewed a webpage, etc. In some cases, deep links may be identified in accordance with a domain white list or a domain black list. Such a domain white list and/or a domain black list may be stored, for example, in connection with the toolbar of the user device 410 or in a database in communication with the deep-link notification service 414. In embodiments, a domain white list and/or domain black list may be updated (e.g., automatically) to remove domains or to add domains to such lists as appropriate. As can be appreciated, the deep-link notification service 414 may be configured to identify deep links for a portion of documents navigated to by a user, for example, to limit network consumption. Although the white list and the black list is described herein as including lists of domains, any identifier that uniquely identifies websites, webpages, or documents may be included in such white or black lists, such as, for example, a URL, an IP address, a string designated to match a domain or URL, etc.

A domain white list refers to a list or a set of domains for which deep links should be or are to be identified. As can be appreciated, in some cases, the white list may include the corresponding deep links or a reference thereto such that querying a search service is not required. A domain white list may be generated manually or automatically and can include any number and manner of domains. For instance, domains included within a white list may be associated with a particular category of domains (e.g., domains associated with ecommerce), may be websites associated with difficult navigation models, may be websites associated with deep links, a combination thereof, or the like. By way of example only, to generate a domain white list, a number of the most popular websites (e.g., 2000 websites) may be analyzed to identify particular websites that may be difficult for users to navigate.

In implementation, upon identifying a document navigated to by a user (e.g. each document navigated to) or a domain associated therewith, a domain white list may be accessed to determine whether the domain corresponding with the navigated to document is included within the domain white list. In this regard, the deep-link identifier 422 may compare the domain corresponding to the navigated to document with the domains listed within the domain white list. An algorithm or lookup system may be used to determine whether a domain of a navigated to document is included within the domain white list. For instance, a lookup table may be used to perform a linear search of a URL or a match string. If the domain of the navigated to document is within the domain white list, deep links associated with the domain may be identified, for example, by issuing a query to a search service and recognizing deep links returned therefrom. On the other hand, if the domain of the navigated to document is not included within the domain white list, navigation continues as typical and the user is not provided with any deep links via the toolbar.

A domain black list refers to a list or a set of domains for which deep links should not be identified. A domain black list may be generated manually or automatically and can include any number and manner of domains. For instance, domains included within a black list may be associated with a particular category of domains (e.g., domains associated with ecommerce), may be websites associated with simple navigation models, may be websites not previously associated with deep links, a combination thereof, or the like. By way of example only, to generate a domain black list, a number of the most popular websites (e.g., 2000 websites) may be analyzed to identify particular websites that may be easy for users to navigate.

In implementation, upon identifying a document navigated to by a user or a domain associated therewith, a domain black list may be accessed to determine whether the domain corresponding with the navigated to document is included within the domain black list. In this regard, the deep-link identifier 422 may compare the domain corresponding to the navigated to document with the domains listed within the domain black list. An algorithm or lookup system may be used to determine whether a domain of a navigated to document is included within the domain black list. For instance, a lookup table may be used to perform a linear search of a URL or a match string. If the domain of the navigated to document is not within the domain black list, deep links associated with the domain may be identified, for example, by issuing a query to a search service and recognizing deep links returned therefrom. On the other hand, if the domain of the navigated to document is included within the domain black list, navigation continues as typical and the user is not provided with any deep links via the toolbar.

The deep-link presenter 424 is configured to present deep links. In one embodiment, deep links and/or deep-link notifications are presented by displaying such data in association with a toolbar to a user via a user interface. In another embodiment, deep links and/or deep-link notifications are presented by communicating such data to another computing device. For example, such data may be communicated to a user device, so as user device 410, such that the user device can incorporate the data into the toolbar displayed to the user, via a display screen of the user device.

A deep-link notification refers to any notification or indication that deep links exist or are available in association with the currently navigated to document (e.g., document displayed via a display screen). A deep-link notification may take any form capable of providing notification to a user and, in some cases, receiving input from a user. For example, in one embodiment, a deep-link notification may be a text box including one or more deep links associated with the navigated to document. In another embodiment, a deep-link notification may be an icon being highlighted, blinking, flashing, changing colors, providing text, providing images or icons, providing animation, or otherwise emphasized to indicate that deep links exist for the navigated to document. A user may then select or hover over such a deep-link notification to initiate display of corresponding deep links. In some cases, the deep-link notification can also be used to receive input from a user indicating an interest in viewing or accessing deep links.

Deep-link notifications can be displayed via a toolbar in any number of ways. In one embodiment, upon identifying one or more deep links to present, a deep-link notification may be displayed in association with the toolbar. In this regard, a deep-link notification may be located on the toolbar or in any location in connection with a toolbar, for example, near the search tool of the toolbar, etc. Alternatively, a deep-link notification may be located at any available position in a web browser window and may even be separate from a web browser window and located elsewhere on the display screen.

In one embodiment, the deep-link presenter 424 might present available deep links upon receiving a user indication, such as receipt of an input from a user indicating an interest in viewing deep links. For example, a deep-link notification providing an indication of available deep links may be initially displayed without providing the specific deep links. In such a case, a user may select the deep-link notification to view the corresponding deep links. In another embodiment, the deep-link presenter 424 might present available deep links automatically. In this regard, the deep-link presenter 424 might present available deep links as the deep-link notification or in connection with the deep-link notification upon the occurrence of an event, such as a determination that one or more deep links exists for the currently navigated to document, upon loading a document, upon a lapse of a time, etc. As can be appreciated, any number of deep links can be provided, such as, for example, all available deep links, a predetermined number of deep links, etc.

By way of example only, FIG. 3 provides an illustration of a web browser 300, according to embodiments of the present invention. Such a web browser can be viewed, for example, via a display screen of a user device, such as user device 410. The web browser window 300 includes a title bar 302, a navigation bar 304, a toolbar 306, and a display pane 308. Each of the components 302, 304, 306, and 308 are generally known in the art and may take various forms and configurations in web browser windows provided by various software providers. One or more of the components 302, 304, 306, and 308 may be modified or excluded from a web browser window either by design of a software provider or a preference or customization of the web browser window by a user.

The title bar 302 is generally located near a top portion of the web browser window 300 and may contain text describing the web browser window or a website that is displayed in the display pane 308. The navigation bar 304 may provide a variety of navigation functions as well as a field for displaying a current web location or for entry of a web location to which navigation is desired. The toolbar 306 may include one or more shortcut buttons that provide ease of access to commonly used functions as well as one or more of a multitude of web browser add-on components that are available in the art.

A deep-link notification 310 is provided in association with the toolbar 306 for providing notifications to a user regarding available deep links corresponding with the website that is displayed in the display pane 308. In embodiments, the deep-link notification 310 may be or include a set of one or more deep links 312 that correspond with the website navigated to by a user (i.e., displayed in the display pane 308). Such selectable deep links 312, such as the "store locator" deep link 318, may be selected by a user to navigate to the particular webpage represented by the selected deep link.

With continued reference to FIG. 3, the display pane 308 may display a webpage as depicted therein. Such a webpage may include one or more links 314 corresponding with the website. The links 314 may be in the form of a World Wide Web address, or a representation thereof.

As can be appreciated, a user may interact with a display screen using well known input components, such as, for example, a mouse, joystick, stylus, touch screen, keyboard, or the like. In this regard, a user may select a deep link to initiate navigation to the corresponding webpage in association with the selected deep link. For example, assume that a user selects the "store locator" deep link 318. In such a case, the action of navigating to the webpage associated with locating stores can be initiated.

Figure 5:
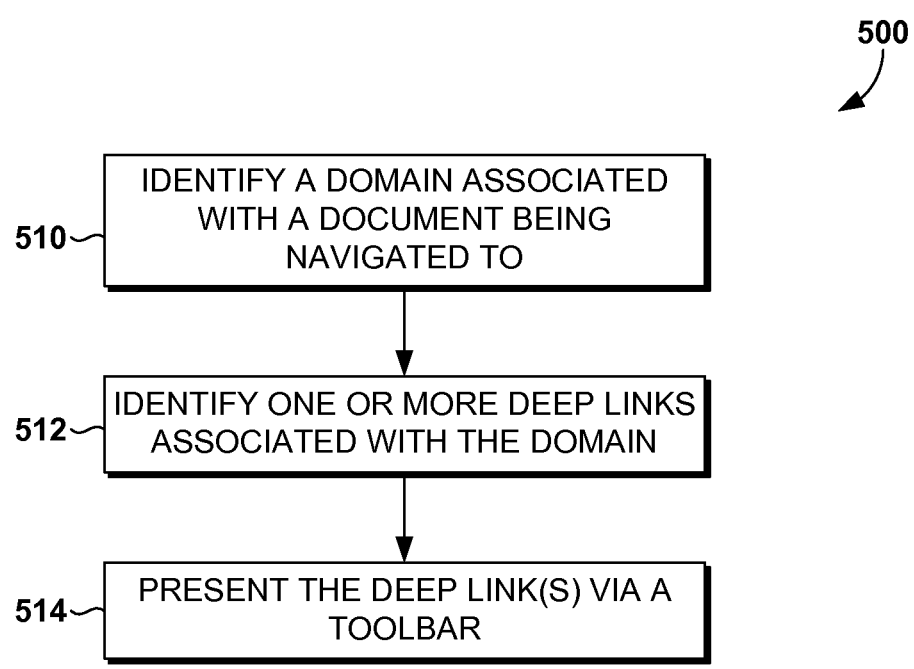
FIG. 5 is a flow diagram depicting an illustrative method for presenting deep links, according to embodiments of the invention.

To recapitulate, embodiments of the invention include systems, machines, media, methods, techniques, processes and options for providing deep links in association with toolbars. Turning to FIG. 5, a flow diagram is illustrated that shows an exemplary method 500 for providing one or more deep links, according to embodiments of the present invention. In some embodiments, aspects of embodiments of the illustrative method 500 can be stored on computer-readable media as computer-executable instructions, which are executed by a processor in a computing device, thereby causing the computing device to implement aspects of the method 500. The same is of course true with the illustrative method 600 depicted in FIG. 6 or any other embodiment, variation, or combination of these methods.

Initially, at block 510, a domain associated with a document being navigated to is identified. In this regard, upon a user navigating to a website, a domain representing the website is identified. At block 512, one or more deep links associated with the domain are identified. Such deep links can be identified using any manner. For example, a search service may be accessed to obtain search results and/or deep links that result from a query corresponding with the identified domain. At block 514, the one or more deep links are presented via a toolbar within a web browser. In some cases, a deep link notification that includes the deep links is presented via the toolbar. In other cases, a deep link notification may be presented via the toolbar and, upon selection thereof, the deep links can be presented.

Figure 6:
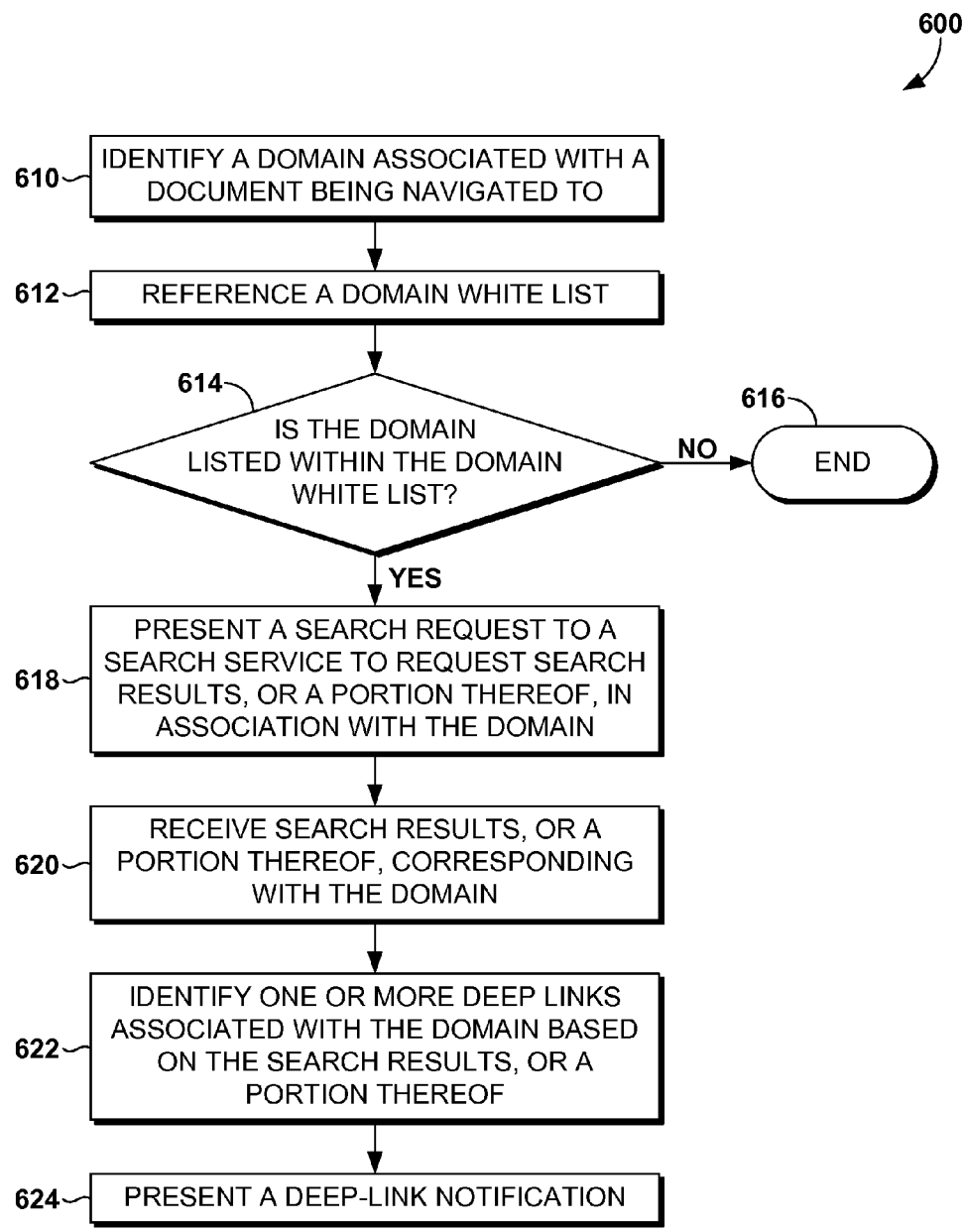
FIG. 6 is a flow diagram depicting an illustrative method of presenting a deep-link notification, in accordance with embodiments of the invention.

Turning now to FIG. 6, a flow chart depicts an exemplary method 600 for providing one or more deep links, according to embodiments of the present invention. Initially, at block 610, a domain associated with a document (e.g., a website or webpage) being navigated to, for example, by a user, is identified. Subsequently, at block 612, a domain white list is referenced. A domain white list specifies a set of one or more domains for which deep links should be identified. Upon referencing the domain white list, at block 614, the identified domain is compared to the white list to determine if the identified domain is listed within the domain white list. If the domain is not listed within the domain white list, the method ends at block 616. If, on the other hand, the domain is listed within the domain white list, a search request is presented to a search service to request search results, or a portion thereof, in association with the domain. This is indicated at block 618.

Search results, or a portion thereof (e.g., deep links), that correspond with the domain are received, as indicated at block 620. In this regard, the search service might return a search result(s), which may include corresponding deep links, or might return deep links (e.g., that correspond with the domain or the top search result). Thereafter, at block 622, one or more deep links associated with the domain are identified based on the received search results, or a portion thereof. For instance, deep links corresponding with a search result may be extracted and/or identified. At block 624, a deep-link notification is presented. For example, a deep-link notification may be displayed to a user via a display screen of a user device. The deep-link notification provides a notification or indication to a user that one or more deep links exist for the website being currently displayed. In one embodiment, the deep-link notification includes the one or more deep links. In another embodiment, the deep-link notification can be selected by a user and, in response thereto, the deep links can be presented. As can be appreciated, in cases that one or more deep links are not identified, for example, when such deep links do not exist for a particular website, a deep-link notification is not displayed to a user.

Various embodiments of the invention have been described to be illustrative rather than restrictive. Alternative embodiments will become apparent from time to time without departing from the scope of embodiments of the inventions. It will be understood that certain features and sub-combinations are of utility and may be employed without reference to other features and sub-combinations. This is contemplated by and is within the scope of the claims.

The invention claimed is:

1. One or more computer-readable storage hardware devices having embodied thereon computer-executable instructions that, when executed by a processor in the device, cause the device to perform a method of providing deep-link notifications, the method comprising:

in accordance with a user navigating to a web site, utilizing a domain identifier associated with the navigated to website as a basis for a search query;

providing the search query indicating the domain identifier associated with the navigated to website to a search service, wherein the search service is capable of searching for content associated with a plurality of websites;

receiving at least one search result related to the domain identifier or at least one deep link related to the domain identifier from the search service based on the search performed for the search query;

using the at least one search result or the at least one deep link from the search service to dynamically identify one or more deep links that correspond with the navigated to website in accordance with navigating to said website, each of the one or more deep links comprising a link that points to a specific item within the website other than a main page of the website; and providing a deep-link notification for presentation via a toolbar, the deep-link notification providing an indication that the one or more deep links are available for the website.

2. The one or more hardware devices of claim 1 further comprising identifying the domain identifier associated with the navigated to website.

3. The one or more hardware devices of claim 1, wherein identification of the one or more deep links that correspond with the navigated to website further comprises determining that the domain is included within a white list that specifies a set of one or more domains for which deep links should be identified.

4. The one or more hardware devices of claim 1, wherein the deep-link notification includes the one or more deep links.

5. The one or more hardware devices of claim 1 further comprising:

receiving a user selection of the deep-link notification; and providing the one or more deep links in response to receiving the user selection of the deep-link notification.

6. The one or more hardware devices of claim 1, wherein the toolbar is displayed within a web browser separate from the website.

7. A method of providing deep-link notifications, the method comprising:

identifying a domain associated with a navigated to website;

determining that the domain is included within a domain white list that specifies a plurality of domains for which deep links should be identified;

in accordance with the domain being included within the domain white list, presenting a search request to a search service to request search results that correspond with the domain, wherein the search service is capable of searching for content associated with a plurality of websites;

receiving at least one search result that corresponds with the domain;

utilizing the at least one search result to identify one or more deep links associated with the website; and presenting a deep-link notification that indicates at least one deep link is available for use in navigating the website, the deep-link notification being presented within a toolbar of a web browser.

8. The method of claim 7, wherein the deep-link notification includes the one or more deep links.

9. The method of claim 8, wherein presenting the deep-link notification comprises displaying the deep-link notification to a user via a display screen.

10. The method of claim 9 further comprising:

receiving a selection of the deep-link notification; and in response to the selection of the deep-link notification, displaying the one or more deep links.

11. The method of claim 7, wherein the at least one search result includes an indication of the one or more deep links.

12. The method of claim 7, wherein the search request comprises a search query for the domain.

13. A system for providing deep-link notifications, the system comprising:

one or more processors coupled to a computer storage medium, the computer storage medium having stored thereon a plurality of computer software components executable by the processor, the computer software components comprising:

a deep-link notification service that:

in accordance with a user navigating to a website, utilizes a domain identifier associated with the navigated to website as a basis for a search query;

provides the search query indicating the domain identifier associated with the navigated to website to a search service, wherein the search service is capable of searching for content associated with a plurality of websites;

receives at least one search result related to the domain identifier or at least one deep link related to the domain identifier from the search service based on the search performed for the search query;

uses the at least one search result or the at least one deep link from the search service to dynamically identify one or more deep links that correspond with the navigated to website in accordance with navigating to said website, each of the one or more deep links comprising a link that points to a specific item within the website other than a main page of the web site; and provides a deep-link notification for presentation via a toolbar, the deep-link notification providing an indication that the one or more deep links are available for the website.

14. The system of claim 13, wherein the deep-link notification includes the one or more deep links.

15. The system of claim 13, wherein the deep-link notification service receives a user selection of the deep-link notification and provides the one or more deep links in response to receiving the user selection of the deep-link notification.

* * * * *